US008650410B2

(12) United States Patent
Komano

(10) Patent No.: US 8,650,410 B2
(45) Date of Patent: Feb. 11, 2014

(54) MUSICAL CONTENT DATA PROCESSING APPARATUS

(75) Inventor: Takeshi Komano, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 397 days.

(21) Appl. No.: 12/770,635

(22) Filed: Apr. 29, 2010

(65) Prior Publication Data

US 2010/0281271 A1 Nov. 4, 2010

(30) Foreign Application Priority Data

Apr. 30, 2009 (JP) ................................ 2009-110454

(51) Int. Cl.
*G06F 11/30* (2006.01)

(52) U.S. Cl.
USPC ........................................................ 713/189

(58) Field of Classification Search
USPC .......... 713/189, 193, 162, 165–167; 380/277, 380/258, 281, 286
See application file for complete search history.

(56) References Cited

U.S. PATENT DOCUMENTS

| | | | | |
|---|---|---|---|---|
| 7,624,199 | B2 * | 11/2009 | Matsushima et al. | 710/5 |
| 7,984,296 | B2 * | 7/2011 | Watanabe et al. | 713/168 |
| 8,401,187 | B2 * | 3/2013 | Wajs et al. | 380/202 |
| 2002/0003886 | A1 * | 1/2002 | Hillegass et al. | 380/282 |
| 2002/0023010 | A1 * | 2/2002 | Rittmaster et al. | 705/26 |
| 2005/0142526 | A1 * | 6/2005 | Haruyama et al. | 434/307 A |
| 2012/0045064 | A1 * | 2/2012 | Rembarz et al. | 380/281 |

FOREIGN PATENT DOCUMENTS

| | | |
|---|---|---|
| JP | 2005-195673 | 7/2005 |
| JP | 2007-034903 A | 2/2007 |

OTHER PUBLICATIONS

Marc A. Kaplan, IBM Cryptolopes™, Super Distribution and Digital Rights Management, Marc A. Kaplan, Dec. 30, 1996.

* cited by examiner

*Primary Examiner* — Beemnet Dada
(74) *Attorney, Agent, or Firm* — Morrison & Foerster LLP

(57) ABSTRACT

A storage portion stores musical contents in which a plurality of musical content material data sets each of which is given a piece of identification information and is encrypted are recorded, and location information for identifying respective locations at which the respective musical content material data sets are situated in the musical contents. The respective locations of the musical content material data sets are correlated with the respective identification information pieces of the musical content material data sets. For use of a desired musical content material data set, the location at which the musical content material data set having designated identification information is stored in the musical contents is identified on the basis of the location information. On the basis of the identified location, the desired musical content material data set is extracted and decrypted.

10 Claims, 5 Drawing Sheets

(1) distribution of voice file (2) encrypted waveform package file WFe

| waveform ID | storage location LC | |
|---|---|---|
| | top address HA | end address EA |
| 001 | aaaa | bbbb |
| 002 | cccc | dddd |
| ⋮ | ⋮ | ⋮ |

MUSICAL CONTENT DATA PROCESSING APPARATUS

BACKGROUND OF THE INVENTION

1. Field of the Invention

The present invention relates to a musical content data processing apparatus which loads encrypted musical content material data sets contained in musical contents into an electronic musical apparatus so that the electronic musical apparatus can use the loaded musical content material data for processing such as generation of musical tone signals.

2. Description of the Related Art

In some cases, conventionally, an electronic musical apparatus such as an electronic musical instrument downloads an encrypted musical content file from a musical content distribution server and uses the downloaded file. For example, an electronic musical apparatus disclosed in Japanese Unexamined Patent Publication No. 2005-195673 takes a desired musical content material data set out of combined musical content data having encrypted musical content material data sets, decrypts the desired musical content material data set, and uses the decrypted musical content material data set.

According to this conventional art, in order to allow decryption only of musical content material data of such kinds as are available on the electronic musical apparatus, kind information of respective musical content material data sets is described in a security information chunk in order to identify musical content material data of available kinds on the basis of the kind information. By such a manner, the conventional art enables the use of the desired musical content material data set without the need for decrypting all the encrypted musical content material data sets. In a case where there are a multiplicity of musical content material data sets of the same kind, however, the conventional art requires decryption of all the musical content material data sets of this kind.

SUMMARY OF THE INVENTION

The present invention was accomplished to solve the above-described problem, and an object thereof is to provide a musical content data processing apparatus which promptly extracts a desired musical content material data set and makes the desired data set available even in a case where musical contents include a multiplicity of encrypted musical content material data sets of the same kind.

In order to achieve the above-described object, the present invention provides a musical content data processing apparatus comprising a musical content storing portion (Cs) for storing musical contents (WFe) in which a plurality of musical content material data sets (WVe: WVe1, WVe2, etc.) each of which is given a piece of identification information (waveform ID) and is encrypted are recorded, and location information (ATe) for identifying respective locations (LC) at which the respective musical content material data sets (WVe) are situated in the musical contents (WFe), the respective locations (LC) of the musical content material data sets (WVe) being correlated with the respective identification information pieces (waveform ID) of the musical content material data sets (WVe); a location identifying portion (P5) for identifying, on the basis of the location information (ATe) stored in the musical content storing portion, a location (LC) which is correlated with an identification information piece (waveform ID) given to a target musical content material data set (WVe) which is to be used; a musical content material extracting portion (P6) for extracting, on the basis of the location (LC) identified by the location identifying portion (P5), the target musical content material data set (WVe) which is to be used from the musical contents (WFe) stored in the musical content storing portion (Cs); and a musical content material decrypting portion (P7) for decrypting the musical content material data set (WVe) extracted by the musical content material extracting portion (P6).

In this case, the musical content data processing apparatus may further include an encrypted first key storing portion for storing an encrypted first key (KFe) obtained by encrypting a first key (KF) used for encryption of the musical content material data sets (WVe: WVe1, WVe2, etc.) by use of apparatus unique information (DN) unique to the musical content data processing apparatus; and a first key decrypting portion (P2) for decrypting the encrypted first key (KFe) stored in the encrypted first key storing portion by use of the apparatus unique information (DN) unique to the musical content data processing apparatus, wherein the musical content material decrypting portion (P7) decrypts the musical content material data set (WVe: WVe2, etc.) extracted by the musical content material extracting portion (P6) by use of the decrypted first key.

In addition, the location information stored in the musical content storing portion (Cs) may be also encrypted; and the location identifying portion (P5) may decrypt the location information stored in the musical content storing portion (Cs) before identifying, on the basis of the decrypted location information, the location correlated with the identification information piece (waveform ID) given to the target musical content material data set (WVe: WVe1, WVe2, etc.) which is to be used.

In addition, the musical content data processing apparatus may further include an encrypted first key storing portion for storing an encrypted first key (KFe) obtained by encrypting a first key (KF) used for encryption of the location information by use of apparatus unique information (DN) unique to the musical content data processing apparatus; and a first key decrypting portion (P2) for decrypting the encrypted first key (KFe) stored in the encrypted first key storing portion by use of the apparatus unique information (DN) unique to the musical content data processing apparatus, wherein the location identifying portion (P5) decrypts the location information stored in the musical content storing portion (Cs) by use of the decrypted first key. Items within parentheses, which are added for convenience of understanding, indicate reference symbols and terms given to the embodiment. The items within parentheses will be similarly provided hereafter as well.

On the musical content data processing apparatus according to the present invention, a musical content storing portion (Cs) stores not only the musical contents (WFe) in which the plurality of musical content material data sets (WVe: WVe1, WVe2, etc.) each of which is given a piece of identification information (waveform ID) and is encrypted are recorded as a waveform package file containing encrypted waveform data sets, but also the location information (ATe) for identifying respective locations (LC) at which the respective musical content material data sets (WVe) are situated in the musical contents (WFe) wherein the respective locations (LC) of the musical content material data sets (WVe) are correlated with the respective identification information pieces (waveform ID) of the musical content material data sets (WVe). When a desired musical content material data set (WVe) which is to be used is designated, the location (LC) which is correlated with the identification information piece (waveform ID) given to the designated musical content material data set (WVe) is identified on the basis of the location information (ATe) stored in the musical content storing portion (Cs) (P5). On the basis of the identified location (LC), the musical content material data set (WVe) having the identification information piece (waveform ID) is extracted from the musical contents (WFe) (P6). The extracted musical content material data set (WVe) is then decrypted (P7) and loaded into a certain musical content material data retaining portion (8*b*) (P8).

As described above, the present invention is designed such that, on the basis of the identification information (waveform ID) for identifying the musical content material data (WVe), the location (LC) at which the desired musical content material data set (WVe) is stored is identified (P5) to extract the musical content material data set (WVe) situated at this location (P6) to decrypt the extracted musical content material data set (WVe) (P7). Therefore, the musical content data processing apparatus according to the present invention is able to promptly extract a desired musical content material data set and make the desired data set available even in a case where there are a multiplicity of musical content material data sets of the same kind.

Furthermore, the present invention can be also applied to a computer program for causing a computer to implement the capabilities of the musical content data processing apparatus and to a storage medium storing the computer program.

DESCRIPTION OF THE PREFERRED EMBODIMENT

Overview of System Configuration

Figure 1:
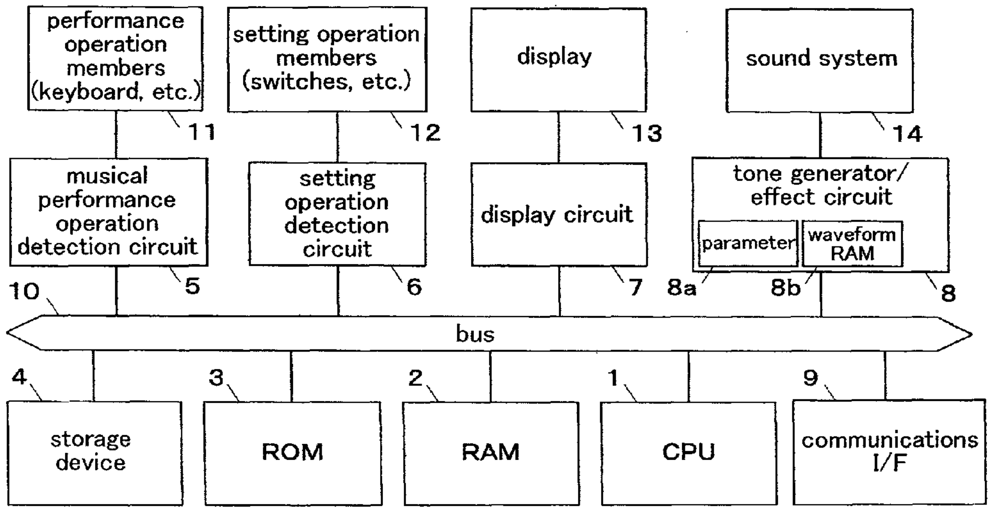
FIG. 1 is a hardware configuration of an electronic musical apparatus according to an embodiment of the present invention.

FIG. 1 is a block diagram indicating an example hardware configuration of an electronic musical apparatus configuring a musical content processing system according to an embodiment of the present embodiment. The electronic musical apparatus of the embodiment of the present invention is a kind of computer having a capability of electronically processing musical information. As the electronic musical apparatus, typically, a musical apparatus such as an electronic musical instrument is employed. As indicated in FIG. 1, the electronic musical apparatus has a central processing unit (CPU) 1, a random-access memory (RAM) 2, a read-only memory (ROM) 3, a storage device 4, a musical performance operation detection circuit 5, a setting operation detection circuit 6, a display circuit 7, a tone generator/effect circuit 8, a communications interface (I/F) 9 and the like. These elements 1 to 9 are connected each other via a bus 10.

The CPU 1 serves as a data processing portion along with the RAM 2 and the ROM 3 to execute, in accordance with given control programs including a musical content file processing program and a musical content data processing program, various kinds of information processing including musical content processing referred to as "voice file loading processing" and "encrypted voice file loading processing" through the use of clock by timer. The RAM 2 is used as a storage management area for keeping data necessary for such processing and making the data available, and a working area for temporarily storing various kinds of data. In order to execute such processing, various kinds of control programs including the musical content file processing program and the musical content data processing program, and preset data are previously stored in the ROM 3.

The storage device 4 includes storage media such as an HD (hard disk), an FD (flexible disk), a CD (compact disk), a DVD (digital versatile disk) and a semiconductor memory such as a flash memory, and drives of the respective storage media. A user of the electronic musical apparatus is allowed to store his desired control programs and musical content files such as automatic performance data and voice (tone color data) files in his desired storage media. Particularly, the storage device which stores voice files is referred to as a voice file storage device. The respective storage media may be either detachable or incorporated into the electronic musical apparatus (electronic musical instrument). Such detachable storage media include a USB memory as described later.

The musical performance operation detection circuit 5 serves as a musical performance operation portion along with performance operation members 11 such as a keyboard. The musical performance operation detection circuit 5 detects musical performance operations of the performance operation members 11 and transmits performance operation information corresponding to the detected operations to the data processing portion (1 to 3). The data processing portion generates substantial performance information in accordance with the performance operation information and transmits the generated substantial performance information to the tone generator/effect circuit 8. The setting operation detection circuit 6 serves as a setting operation portion (panel operation portion) along with setting operation members (panel operation members) 12 such as switches and a mouse. The setting operation detection circuit 6 detects operations of the setting operation members 12 and transmits setting operation information corresponding to the detected operations to the data processing portion. The data processing portion makes various settings on the basis of the setting operation information. The display circuit 7 has a display 13 such as an LCD for displaying various kinds of screens necessary for musical performance and settings and indicators/lamps (not shown) to control what is displayed on the display 13 and illumination of the indicators/lamps in accordance with instructions of the data processing portion to provide the user with visual guidance on musical performance and setting operations.

The tone generator/effect circuit 8, which includes a tone generator and a DSP, generates musical tone signals on the basis of the substantial performance information obtained from the performance operation information transmitted from the musical performance operation detection circuit 5 or musical tone signals on the basis of automatic performance data obtained from the ROM 3 or the storage device 4, or the communications I/F 9, and adds certain effects to the generated musical tone signals. A sound system 14, which has a D/A conversion portion, amplifiers and speakers, emits musical tones on the basis of the musical tone signals output from the tone generator/effect circuit 8.

The tone generator/effect circuit 8 is provided with a tone color data storage portion for storing tone color data such as tone color parameter data (voice parameters) and waveform data used for generation of musical tone signals. For example, preset tone color data such as preset tone color parameters and preset waveform data which are previously provided for the electronic musical apparatus is stored in a ROM portion of the tone color data storage portion, whereas later-added tone color parameter data and waveform data are stored in storage areas 8*a*, 8*b* of a RAM portion, respectively. A preset waveform data storage area of the ROM portion is referred to as a "waveform ROM", whereas the waveform data storage area 8*b* of the RAM portion is referred to as a "waveform RAM". Waveform data loaded from the storage device 4 is to be stored in the waveform RAM 8*b*.

The communications I/F 9, which includes one or more of a wired I/F for music such as MIDI, a general-purpose short range wired I/F such as USB and IEEE1394, a general-purpose network I/F such as Ethernet (trademark), a general-purpose short range wireless I/F such as wireless LAN and Bluetooth (trademark), and the like, transmits/receives MIDI performance data to/from other musical apparatuses and receives control programs and musical content files such as automatic performance data and voice (tone color) files from an external apparatus such as a server computer to store the received data, programs and files in the storage device 4.

Through the USB I/F included in the general-purpose short range wired I/F, the electronic musical apparatus is able to transmit/receive various kinds of information to/from an external USB apparatus. To a connection slot of the USB I/F, a USB memory may be attached (connected). For convenience of explanation, however, the USB memory is regarded as the above-described detachable storage medium which is included in the storage device 4.

[Format of Voice (Tone Color) Data]

Figure 2:
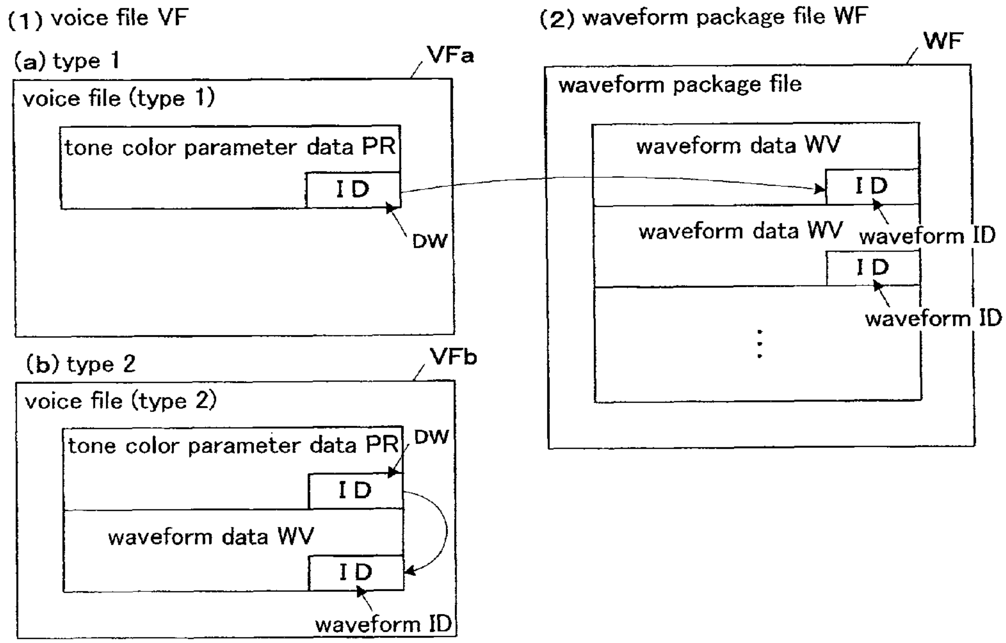
FIG. 2 is an example format of voice data according to the embodiment of the present invention.

The electronic musical apparatus (electronic musical instrument) according to the embodiment of the present invention is designed such that the voice data (tone color data) stored in the voice file storage device is to be read into the apparatus, that is, into the RAM portion of the tone generator/effect circuit 14 to make the voice data available. The reading of the voice data into the apparatus is referred to as "loading". The voice data which is to be newly loaded into the electronic musical apparatus is typically retrieved from a voice data distribution server, so that the retrieved voice data is stored in the voice file storage device. By use of a personal computer (PC) (not shown), for example, the user of the electronic musical apparatus downloads a voice file from the distribution server and stores the downloaded voice file in a USB memory so that the user can use the USB memory as a voice file storage device by attaching the USB memory to the USB slot of the electronic musical apparatus. Alternatively, the user downloads a voice file directly from the distribution server through the communications I/F 9 via a router and a LAN to the electronic musical apparatus and stores the downloaded voice file in the incorporated storage medium such as the HD so that the user can use the incorporated storage medium as the voice file storage device. FIG. 2 indicates a format of voice data stored in the voice file storage device.

The voice data stored in the voice file storage device 4 is referred to as additional voice data in comparison with the preset tone color data previously provided for the electronic musical apparatus. The additional voice data is formed of two kinds of voice file VF and a waveform package file WF. As indicated in FIG. 2(1), more specifically, the voice file VF has two types: type 1 and type 2. As indicated in FIG. 2(2), the waveform package file WF is stored in the storage device 4 so that a voice file VFa of type 1 is correlated with the waveform package file WF. The waveform package file WF includes a plurality of waveform data sets (also referred to as musical tone waveform data sets) WV each of which is different data and has a unique ID (referred to as "waveform ID").

As indicated in FIG. 2(1)(*a*), the voice file VFa of type 1 is a musical content file formed only of "tone color parameter data (also referred to as a "tone color parameter" or a "voice parameter") PR". The tone color parameter data PR is formed of various kinds of musical tone signal generation setting parameters regarding tone color such as EG (envelope generator), EQ (equalizer) and LFO (low frequency oscillator). In order to use the voice file VFa of type 1, it is necessary to load not only the voice file VFa but also the waveform data set WV stored in the waveform package file WF into the electronic musical apparatus (electronic musical instrument) so that the electronic musical apparatus can emit musical tones on the basis of the voice file VFa.

In the tone color parameter PR, therefore, waveform identification information DW indicative of the ID of the waveform data set WV used along with this tone color parameter PR is recorded, as indicated in "ID" of FIG. 2(1). On the basis of the waveform identification information DW, the waveform data set WV which is to be loaded along with this tone color parameter PR is identified. That is, the waveform data sets WV contained in the waveform package file WF have unique waveform IDs, respectively. Therefore, a target waveform data set WV which is to be loaded can be loaded by specifying the unique waveform ID of the target waveform data set WV on the basis of the waveform identification information DW of the target tone color parameter PR. The adoption of the format of type 1 allows not only shared use of a waveform data set WV with voice files VFa but also prevention of redundant storage of a waveform data set to reduce the data amount stored in the voice file storage device 4, which contributes to reduction in the amount of data communicated at the time of distribution of voice data.

A voice file VFb of type 2 is a combined musical content file formed of "a tone color parameter data set RP+a waveform data set WV" as indicated in FIG. 2(1)(b). As for the voice file VFb of type 2, the electronic musical apparatus is readily able to emit musical tones on the basis of the voice file VFb of type 2 only by loading the voice file VFb. In the voice file VFb of type 2, more specifically, not only a tone color parameter PR but also a waveform data set WV used along with the tone color parameter PR are stored. Similarly to the case of type 1, the waveform data set WV is provided with a unique waveform ID, whereas the tone color parameter PR has waveform identification information DW for identifying the waveform ID of the waveform data set WV which is to be loaded along with the tone color parameter PR.

The tone color parameter data sets PR and the waveform data sets WV loaded into the electronic musical apparatus are stored in the tone color parameter storage area 8*a* and the waveform RAM 8*b* of the tone generator/effect circuit 8, respectively. At the time of loading of tone color data, however, it is checked by a function of prohibiting redundant storage of a waveform data set by the musical content file processing program whether a waveform data set WV of a certain waveform ID which is to be loaded is already stored in the waveform RAM 8*b*. Therefore, the waveform RAM 8*b* will never allow redundant storage of waveform data sets WV of the same waveform ID.

In some cases, two or more waveform data sets WV are identified on the basis of a voice file VF. Such cases include a case in which waveforms of musical tone signals vary depending on tone range and a case in which musical tones are emitted by overlaying musical tone waveforms. In such cases, the VFb of type 2 may be adopted, so that all the waveform data sets WV are stored in the voice file VF, or the VFa of type 1 may be adopted, so that all the waveform data sets WV are stored in the waveform package file WF. Alternatively, some of the waveform data sets WV may be stored in the voice file VF, with the other waveform data sets WV being stored in the waveform package file WF (such a voice file VF of this type is referred to as voice file VFc of "type 3"). The respective voice files VF can be given their file extensions having character strings corresponding to their respective file types so that the user can recognize the respective types of the voice files VF on the basis of the file extensions.

Figure 3:
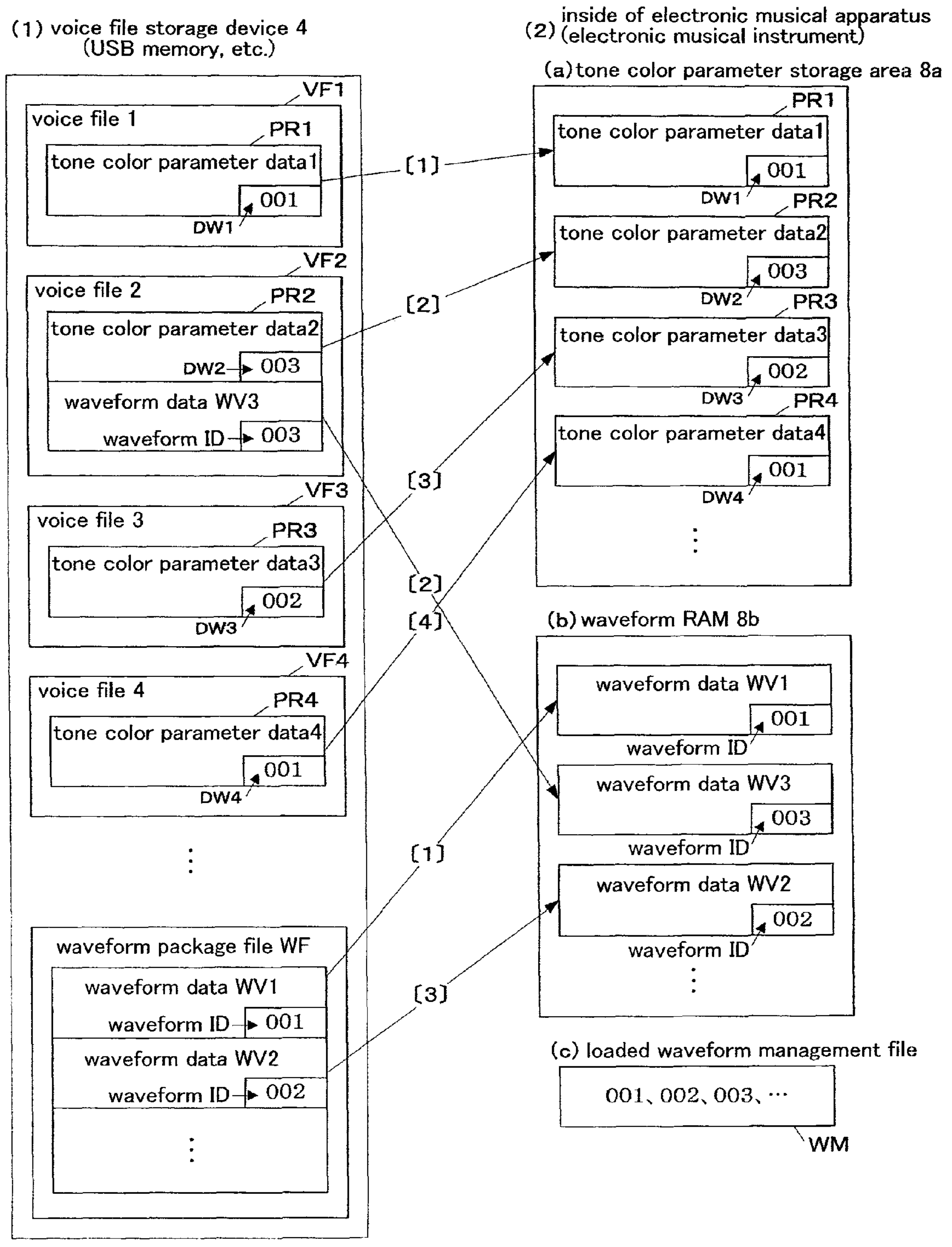
FIG. 3 is example loading of voice data according to the embodiment of the present invention.

FIG. 3 indicates an example loading of voice data according to the embodiment of the present invention. FIG. 3(1) indicates voice data stored in the voice file storage device 4 such as a USB memory. In this example, as indicated in FIG. 3(1), the voice file storage device 4 stores a plurality of voice files VF1, VF2, etc. and a waveform package file WF. In this figure, voice filenames such as "voice file 1", "voice file 2", etc. and waveform ID values such as "001", "002", etc. are given for convenience in explanation.

FIG. 3(2)(*a*), (*b*) and (*c*) indicate storage states of the tone color parameter storage area 8*a*, the waveform RAM 8*b* and a management file storage area of the electronic musical apparatus (electronic musical instrument) used for the loading of voice data, respectively. The management file storage area is a storage area provided in the RAM portion of the tone generator/effect circuit 8 in order to store a loaded waveform management file WM in which waveform IDs of newly loaded waveform data sets WV are successively stored. The tone color parameter storage area 8*a*, the waveform RAM 8*b* and the loaded waveform management file WM of FIG. 3(2) indicative of the electronic musical apparatus side indicate the respective states where the voice data indicated in FIG. 3(1) has been already loaded. Before the loading of these voice data, more specifically, the tone color parameter storage area 8*a*, the waveform RAM 8*b* and the loaded waveform management file WM are vacant, respectively. The management file storage area may be provided in the RAM 2.

For loading the voice data stored in the voice file storage device 4 into the electronic musical apparatus (electronic musical instrument) in the shown order, that is, voice file numbers "1", "2", etc., procedures are done in the shown order "[1]", "[2]", etc. as described below:

[1] When the first voice file ("voice file 1") VF1 is designated, the tone color parameter data PR1 contained in the designated voice file VF1 is read into the tone color parameter storage area 8*a*. The voice file VF1 is type 1. It is then checked whether the waveform ID="001" specified by the waveform identification information DW1 of the tone color parameter data PR1 is stored in the loaded waveform management file WM. The check finds out the absence of the waveform ID="001" as a loaded waveform ID in the management file WM. In accordance with the waveform identification information DW1 of the voice file VF1, therefore, the waveform data WV1 having the waveform ID="001" is read into the waveform RAM 8*b* from the waveform package file WF, with the waveform ID="001" also being written into the management file WM.

[2] The subsequently designated second voice file ("voice file 2") VF2 is type 2. Because the waveform ID="003" of the waveform identification information DW2 contained in the tone color parameter data PR2 is not stored in the management file WM, the tone color parameter data PR2 is read into the storage area 8*a* from the voice file VF2 itself. In accordance with the waveform identification information DW2, in addition, the waveform data WV3 of the waveform ID="003" is read into the waveform RAM 8*b*, with the waveform ID="003" being written into the management file WM.

[3] As for the subsequently designated third voice file ("voice file 3") VF3 as well, the tone color parameter data PR3 of the third voice file VF3 is read into the storage area 8*a*. The voice file VF3 is type 1. The waveform ID="002" specified by the waveform identification information DW3 contained in the tone color parameter data PR3 is not stored in the management file WM. In accordance with the waveform identification information DW3, therefore, the waveform data WV2 of the waveform ID="002" is read into the waveform RAM 8*b* from the package file WF, with the waveform ID="002" being written into the management file WM.

[4] As for the subsequently designated fourth voice file ("voice file 4") VF4, the waveform data WV1 having the waveform ID="001" specified by the waveform identification information DW4 of the tone color parameter data PR4 of the fourth voice file VF4 has been already read into the waveform RAM 8*b*, with the waveform ID="001" having been already written into the management file WM. Therefore, the reading of the waveform data WV1 into the waveform RAM 8*b* is prohibited, with only the tone color parameter data PR4 being read into the storage area 8*a*.

As for subsequent voice files, similarly to the above-described cases, the tone color parameter data sets PR of designated voice files VF are stored in the tone color parameter storage area 8*a*. Only in a case where a waveform ID specified by waveform identification information DW of a tone color parameter data set PR is not stored in the waveform management file WM, in addition, waveform data WV identified by the waveform ID is read into the waveform RAM 8*b* from a corresponding voice file VF or the waveform package file WF, with the waveform ID being written into the management file WM.

As for the musical content file processing system according to the embodiment of the present invention, as described above, the voice files VF stored in the storage device 4 as musical content files include the first type VFa having only "tone color parameter PR" (only the first musical content material) and the second type VFb having "tone color parameter PR+waveform data WV" (the first musical content material+the second musical content material). Each waveform data set WV is given a waveform ID, whereas each tone color parameter PR has waveform identification information DW for specifying a waveform ID of a waveform data set WV which is to be used in combination with the tone color parameter PR. A waveform data set WV which is to be used in combination with a tone color parameter PR of the first type VFa is stored in the separately provided waveform package file WF. For loading the tone color parameters PR: PR1 to PR4 of the voice files VF: VF1 to VF4 into the electronic musical apparatus (electronic musical instrument), more specifically, in the cases [1], [3] of the voice files VF1, VF3 of the first type VFa, the tone color parameters PR1, PR3 contained in the voice files VF1, VF3 and the waveform data sets WV1, WV2 which are contained in the waveform package file WF and are given the waveform IDs specified by the waveform identification information DW1, DW3 are loaded. In the case [2] of the voice file VF2 of the second type VFb, the tone color parameter PR2 and the waveform data WV3 contained in the voice file VF2 are loaded. In the case [4] of the voice file VF4 where the waveform data WV1 which is to be used in combination with the tone color parameter PR4 contained in the voice file VF4 has been already loaded, however, iterated loading (redundant storage) of the loaded waveform data WV1 is prohibited regardless of file type. In the case of the voice file VF4, more specifically, only the tone color parameter PR4 is loaded in order to reduce the amount of waveform data stored in the electronic musical apparatus.

[Example Operational Flow of Musical Content File Processing]

Figure 4:
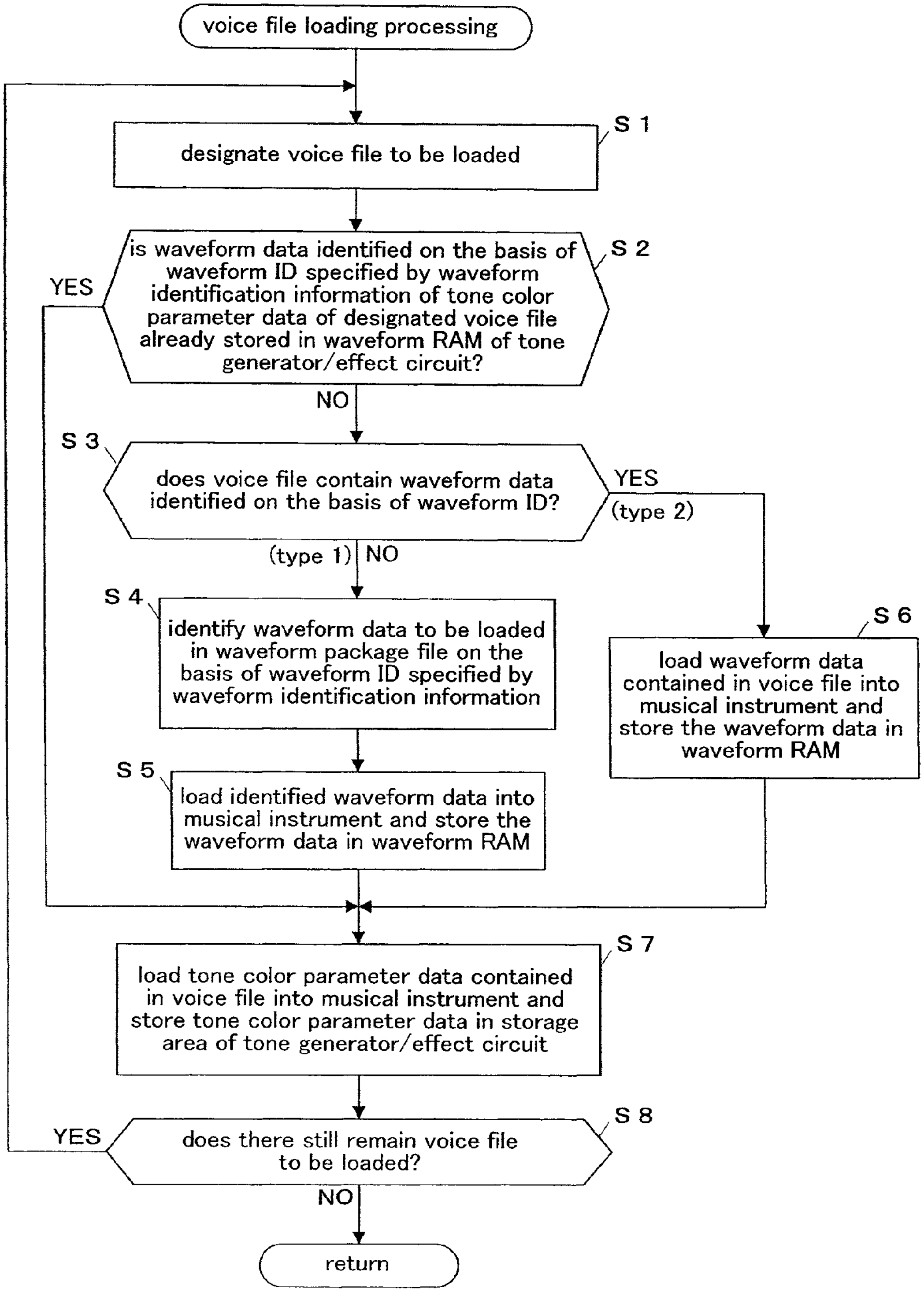
FIG. 4 is an example flow of voice file loading processing according to the embodiment of the present invention.

FIG. 4 is an example flowchart indicative of the musical content file processing according to the embodiment of the present invention. The musical content file processing is referred to as the "voice file loading processing" as described above. In this processing, the voice files VF are regarded as musical content files, whereas the tone color parameter data (voice parameter) PR and waveform data WV are regarded as the first and second musical content materials, respectively. When the electronic musical apparatus (electronic musical instrument) is instructed to move from standby state where the electronic musical apparatus is available for various processing modes into a voice file loading processing mode to start the voice file loading processing, the CPU 1 displays a screen for designating a voice file on the display 13, determines in accordance with user's manipulation, the voice file storage device which stores the voice data which is to be loaded, and presents voice files that can be loaded from the voice file storage device to the user. In step S1, the CPU 1 designates, in accordance with user's manipulation, a voice file VF which is to be loaded from the voice file storage device.

In step S2, the CPU 1 checks waveform IDs stored in the loaded waveform management file WM to determine whether the waveform data set (referred to as "designated waveform data") WV identified on the basis of the waveform ID specified by the waveform identification information DW contained in the tone color parameter data PR of the designated voice file VF is already stored in the waveform RAM 8*b* of the tone generator/effect circuit 8. More specifically, each time a waveform data set WV is loaded into the tone generator/effect circuit 8 to be stored in the waveform RAM 8*b*, the waveform ID of the stored waveform data set WV is stored in the loaded waveform management file WM. By examining the management file WM, therefore, the CPU 1 is able to determine whether the designated waveform data set WV is already stored in the waveform RAM 8*b*.

When it is determined that the designated waveform data set WV is not stored in the waveform RAM 8*b* because of absence of the waveform ID in the waveform management file WM (S2=NO), the CPU 1 proceeds to step S3 to determine whether the designated voice file VF contains the designated waveform data set WV identified on the basis of the waveform ID specified by the waveform identification information DW. In other words, the CPU 1 determines in step S3 whether the designated voice file VF is type 1 or not. The determination on the presence of the designated waveform data WV in the voice file VF may be made either by actually searching the voice file VF on the basis of the waveform identification information DW or by distinguishing according to file type such as the file extension.

When it is determined in the file type determination step S3 that the designated voice file VF is a voice file VFa of type 1 (S3=NO), the CPU 1 proceeds to step S4 to identify the designated waveform data set WV which is to be loaded in the waveform package file WF on the basis of the waveform ID specified by the waveform identification information DW. The CPU 1 then proceeds to step S5 to load the designated waveform data set identified in step S4 into the electronic musical apparatus (electronic musical instrument) to store the loaded waveform data in the waveform RAM 8*b*. When it is determined in the file type determination step S3 that the designated voice file VF is a voice file VFb of type 2 (S3=YES), the CPU 1 proceeds to step S6 to load the designated waveform data set WV contained in the voice file VF into the electronic musical apparatus (electronic musical instrument) to store the loaded waveform data WV in the waveform RAM 8*b*.

When it is determined in step S2 that the designated waveform data set WV is already stored in the waveform RAM 8*b* (S2=YES), or after the loading of the designated waveform data WV in step S5 or step S6, the CPU 1 proceeds to step S7 to load the tone color parameter data PR contained in the designated voice file VF into the electronic musical apparatus (electronic musical instrument) to store the tone color parameter data PR in the storage area 8*a* of the tone generator/effect circuit 8.

In the following step S8, it is determined whether there still remains a voice file VF which is to be loaded. When it is determined that there is a voice file VF which is to be loaded (S8=YES), the CPU 1 returns to step S1 to designate a new voice file VF which is to be loaded to repeat the above-described steps S1 to S7 as long as there remains a voice file VF which is to be loaded. When it is determined that there is no voice file VF which is to be loaded any more (S8=NO), the voice file loading processing (musical content file processing) completes, so that the electronic musical apparatus (electronic musical instrument) returns to the standby state.

In a case where a plurality of waveform data sets WV are identified in a voice file VF, when it is determined in step S2 that at least one of the waveform data sets WV is not stored in the RAM 8*b*, the CPU 1 proceeds to step S3 to execute steps S4 to S6 for the designated waveform data WV which is not stored. In a case where the voice files VF include a voice file VFc of type 3, the file type determination step S3 determines which one of the types 1 to 3 a target voice file is. As for the voice file VFc which is determined that the voice file VFc is type 3, the CPU 1 executes processes similar to steps S4 to S6 for designated waveform data WV which is not stored in the waveform RAM 8*b*. More specifically, the designated waveform data WV which is not contained in the voice file VFc and is not stored in the RAM 8*b* is read from the waveform package file WF and then stored in the waveform RAM 8*b* (S4 to S5), whereas designated waveform data WV which is contained in the voice file VFc and is not stored in the RAM 8*b* is read out from the voice file VFc and then stored in the waveform RAM 8*b* (S6).

As the combined musical content file formed of "the first musical content material+the second musical content material", this embodiment employs the example of the voice file (VF) formed of "tone color parameter data (RP)+waveform data (WV)". However, other types of combination may be employed. Any combinations such as "automatic performance data+audio data", "automatic performance data+video data" and "automatic accompaniment style data+audio data" may be employed as long as the combined musical content file includes the first musical content material (automatic performance data, automatic accompaniment style data, etc.) and the second musical content material (audio data, video data, etc. related to the first musical content material). However, the first musical content material is always unique to each musical content file, whereas the second musical content material can be shared with some of the first musical content materials. Furthermore, the combined musical content file may include three or more kinds of musical content material.

[Encryption of Voice Data]

Figure 5:
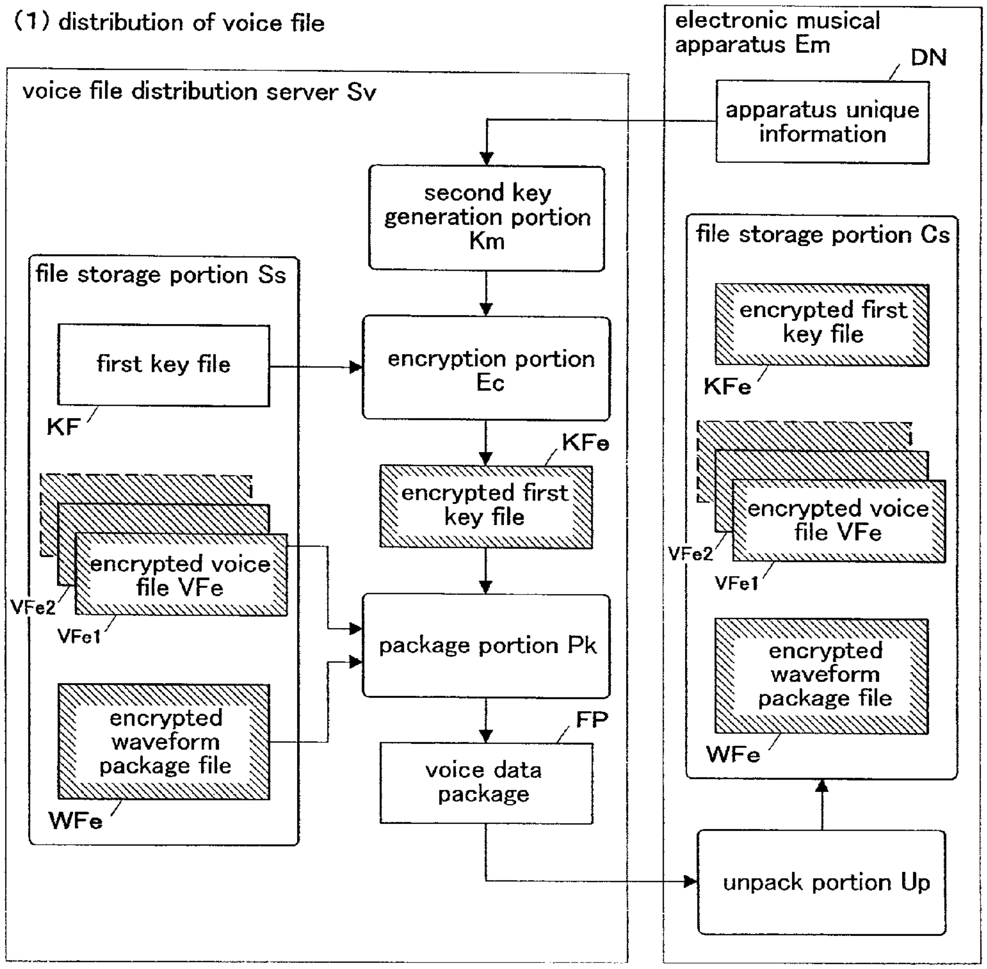
FIG. 5 is a diagram explaining encryption of voice data according to the embodiment of the present invention.
Figure 5:
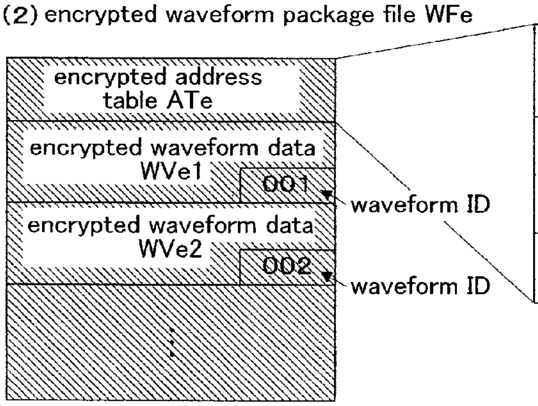

The musical content processing system according to the embodiment of the present invention enables the electronic musical apparatus Em to receive the above-described voice data from a voice file distribution server Sv (not shown) via the communications I/F 9. In this case, the voice data distributed from the server Sv to the electronic musical apparatus Em is encrypted. More specifically, the voice data is formed of voice files VF and the waveform package file WF as described above. In addition, the voice files VF include the voice files VFa of type 1 and the voice files VFb of type 2. These files VF (VFa, VFb), WF are previously encrypted on the server Sv. FIG. 5 is a diagram which explains the encryption of voice data according to the embodiment of the present invention.

The voice file distribution server (hereafter referred to as "server") Sv is configured similarly to the hardware configuration of the electronic musical apparatus Em indicated in FIG. 1. However, the server Sv may not have the musical performance operation portion (musical performance operation detection circuit 5 and the performance operation members 11) and a musical tone generation portion (the tone generator/effect circuit 8 and the sound system 14). In order to perform a function of distributing voice data, the server Sv has a server file storage portion Ss, a second key generation portion Km, an encryption portion Ec and a package portion Pk as indicated in the left of FIG. 5(1). The server file storage portion Ss is constructed in an external storage device (e.g., HDD), while respective functions of the second key generation portion Km, the encryption portion Ec and the package portion Pk are performed mainly by a data processing portion served notably by a CPU. The electronic musical apparatus Em has a distribution request portion which transmits apparatus unique information DN, an unpack portion Up and a client file storage portion Cs as indicated in the right of FIG. 5(1). The distribution request portion and the unpack portion Up are performed mainly by the data processing portion (1 to 3) served notably by the CPU 1, while the client file storage portion Cs is constructed in the external storage device 4 (e.g., USB memory).

On the server Sv, the plurality of voice files VF: VF1, VF2, etc. and the waveform package file WF such as those indicated in FIG. 2 and FIG. 3(1) are previously encrypted by use of a first key (KF) uniquely defined by the server Sv's side so that encrypted voice files VFe and an encrypted waveform package file WFe are stored in the server file storage portion Ss, respectively. The respective voice files VF1, VF2, etc. of the voice file group VF are encrypted individually by use of the first key (KF), so that the encrypted voice files VFe: VFe1, VFe2, etc are stored. As described later with reference to FIG. 5(2), the encrypted waveform package file WFe includes not only the encrypted waveform data sets WVe: WVe1, WVe2, etc. obtained by individually encrypting the waveform data sets WV: WV1, WV2, etc. by use of the first key (KF) but also an encrypted address table ATe for designating the individual encrypted waveform data sets WVe. The file storage portion Ss also stores a first key file KF in which the first key used for the encryption of the files VF, WF is stored as a file. Symbols "VFe", "WVe" representatively indicate the encrypted individual voice file and the encrypted individual waveform data set.

At the time of distribution of voice data, as indicated in FIG. 5(1), the electronic musical apparatus Em requests distribution of voice data via the distribution request portion and the communications 9 and transmits its own apparatus unique information DN to the server Sv. The apparatus unique information DN is identification information which is unique to the electronic musical apparatus Em such as unique ID generated on the basis of a MAC address of a network I/F and stored in an apparatus information storage area of the ROM 3. Once the server Sv receives the apparatus unique information DN from the electronic musical apparatus Em via a communications I/F, the second key generation portion Km generates a second key on the basis of the received apparatus unique information DN. In addition, the encryption portion Ec encrypts the first key file KF in real time by use of the second key to generate an encrypted first key file KFe.

Furthermore, the package portion Pk combines the generated encrypted first key file KFe with the encrypted voice files VFe and the encrypted waveform package file WFe that have been already provided in the server file storage portion Ss so that these files KFe, VFe, WFe are packaged as a file FP referred to as a "voice data package". The server Sv then transmits the voice data package FP to the electronic musical apparatus Em via the communications I/F.

When the electronic musical apparatus Em receives the voice data package FP from the server Sv via the communications I/F 9, the unpack portion Up unpacks the voice data package FP so that the voice data package FP returns to the respective encrypted files KFe, VFe, WFe. The unpacked encrypted first key file KFe, encrypted voice files VFe and encrypted waveform package file WFe are stored as a set (referred to as a "voice data set") in the client file storage portion Cs (storage device 4 such as USB flash memory) so that the tone generator/effect circuit 8 will use the voice data set.

FIG. 5(2) indicates a data structure of the encrypted waveform package file WFe. For using a waveform data set WV contained in the waveform package file WF on the electronic musical apparatus Em, the waveform data set identified on the basis of the waveform ID specified by the waveform identification information DW of a voice file VFa of the first type is loaded into the waveform RAM 8*b* of the tone generator/effect circuit 8, as described above. In a case where the waveform package file WF is encrypted, however, it would be quite time consuming to decrypt all the encrypted waveform data sets WVe in order to search all the encrypted waveform data sets WVe contained in the encrypted waveform package file WFe for the desired waveform data set identified on the basis of the waveform ID.

Therefore, the musical content processing system is designed such that the server Sv previously individually encrypts the waveform data sets WV: WV1, WV2, etc. on the basis of the respective waveform IDs by use of the first key (KF) to generate the encrypted waveform data sets WVe: WVe1, WVe2, etc. In addition, the server Sv provides an address table AT which lists respective addresses of the encrypted waveform data sets WVe encrypted on the basis of the respective waveform IDs, and also encrypts the address table AT by use of the first key (KF) to generate the encrypted address table ATe. The encrypted address table ATe, that is, the address table AT is designed, as indicated in the right of FIG. 5(2), to list the respective waveform IDs: 001, 002, etc. and storage location information LC indicative of information on respective top addresses HA and respective end addresses EA (HA: aaaa, bbbb, etc.; EA: cccc, dddd, etc.) at which the respective encrypted waveform data sets WVe: WVe1, WVe2, etc. having the respective waveform IDs are located in the encrypted waveform package file WFe so that the respective waveform IDs are correlated with their corresponding storage location information LC.

In a case where a plurality of encrypted waveform data sets WVe are to be sequentially stored in the encrypted waveform package file WFe, the encrypted address table ATe may be designed to list only the respective top addresses HA. In this case, the end address EA of a target waveform ID is obtained on the basis of the top address HA of a waveform ID of a waveform data set WVe which is stored subsequently to an encrypted waveform data set WVe having the target waveform ID.

As indicated in the left of FIG. 5(2), the encrypted address table ATe and the encrypted waveform data sets WVe: WVe1, WVe2, etc. are constituent data of the encrypted waveform package file WFe. More specifically, each of the encrypted waveform data sets WVe: WVe1, WVe2, etc. is encrypted as a single waveform data set WVe. The individual encrypted waveform data sets WVe are then included in the waveform package file WFe. Therefore, even if some of the waveform data sets WVe are extracted from the waveform package file WFe on the basis of the address table ATe, each of the extracted waveform data sets WVe can be decrypted successfully.

As a result, when the electronic musical apparatus Em receives the distribution of the voice data set (KFe+VFe+WFe) including such an encrypted waveform package file WFe, the electronic musical apparatus Em is able to decrypt the respective files KFe, VFe, WFe of the voice data set stored in the file storage portion Cs to load the tone color parameter data PR contained in the voice file VFe and the waveform data WV contained in the voice file VFe or the waveform package file WFe into the parameter storage area 8*a* and the waveform RAM 8*b* of the tone generator/effect circuit 8, respectively. In this case, the electronic musical apparatus Em decrypts only necessary part of the encrypted waveform package file WFe. More specifically, the electronic musical apparatus Em first decrypts the encrypted address table ATe, and then accesses desired encrypted waveform data WVe promptly by use of the decrypted address table AT to supply the desired encrypted waveform data WVe to a certain working area of the RAM 2. The electronic musical apparatus Em then decrypts the desired encrypted waveform data WVe and loads the decrypted waveform data WV into the waveform RAM 8*b*.

[Example Operational Flow of Encrypted Voice File Loading Processing]

Figure 6:
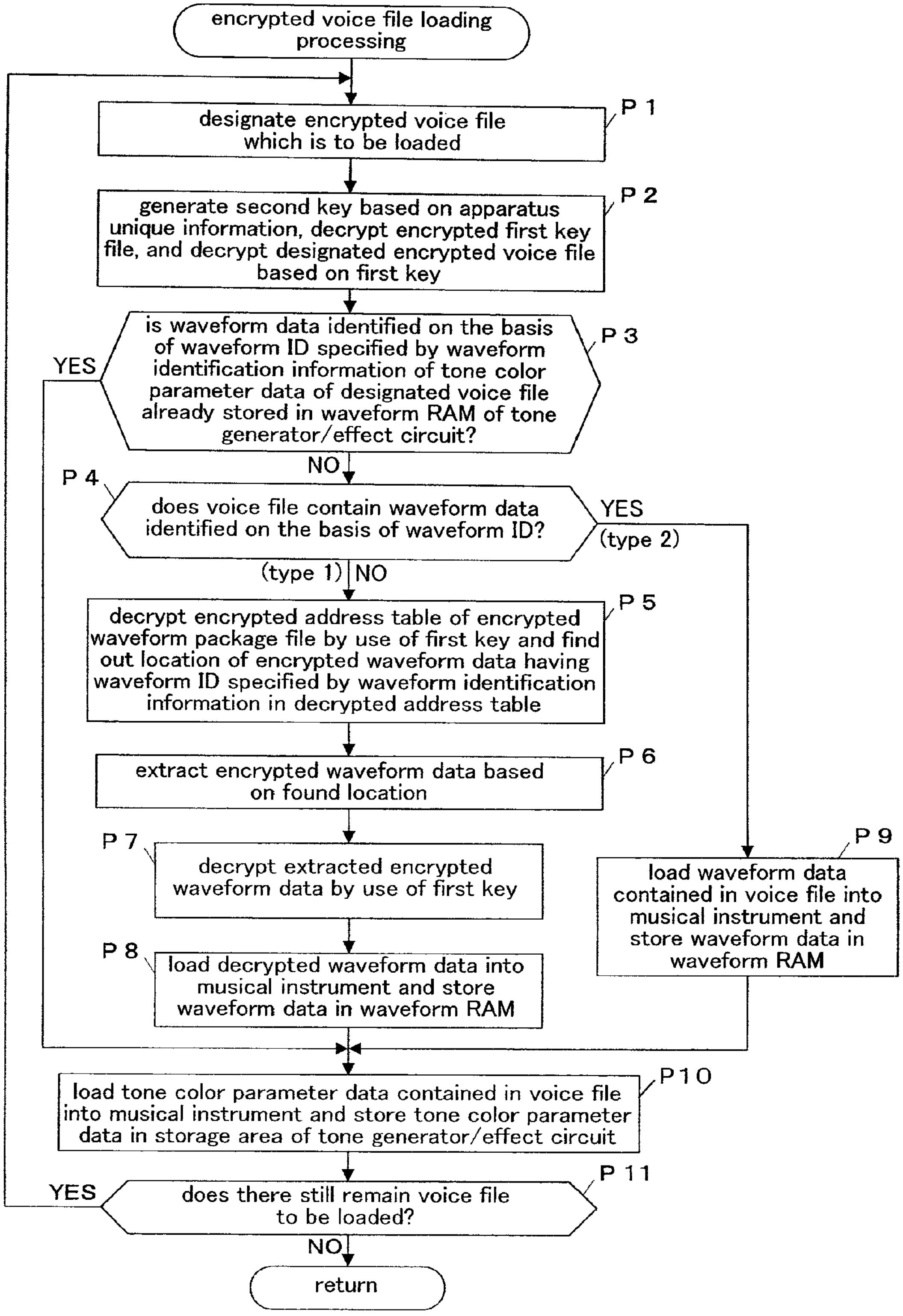
FIG. 6 is an example flow of encrypted voice file loading processing according to the embodiment of the present invention.

FIG. 6 is an example flowchart indicative of musical content data processing according to the embodiment of the present invention. The musical content data processing is also referred to as the "encrypted voice file loading processing". When the electronic musical apparatus (electronic musical instrument) is instructed to move from the standby state where the electronic musical apparatus is available for various processing modes into an encrypted voice file loading processing mode, the encrypted voice file loading processing starts. The CPU 1 first displays a screen for designating a voice data set on the display 13. In response to a user's manipulation of selecting a voice data set, the CPU 1 determines the file storage portion Cs which stores the voice data set including the voice data which is to be loaded (the file storage portion Cs stores one or more voice data sets). The CPU 1 then selects an appropriate voice data set in accordance with user's instructions, and proceeds to step P1.

In step P1, in accordance with user's selection, the CPU 1 selects, from the selected voice data set, one or more of the encrypted voice files VFe which are to be loaded. The CPU 1 then selects the voice file VFe situated in the first place (in certain order such as in alphabetical order of filename) from among the selected voice files VFe and designates the selected voice file VFe as the one to be loaded. In step P2, the CPU 1 reads out the apparatus unique information DN from the apparatus information storage area of the ROM 3, generates the second key on the basis of the apparatus unique information DN, decrypts the encrypted first key file KFe contained in the voice data set by use of the second key, and then decrypts the designated encrypted voice file VFe on the basis of the first key (KF) obtained by the decryption of the first key file KFe.

In step P3, the CPU 1 checks waveform IDs stored in the loaded waveform management file WM (see FIG. 3(2)(c)) to determine whether the waveform data (designated waveform data) WV identified on the basis of the waveform ID specified by the waveform identification information DW contained in the tone color parameter data PR of the designated voice file VF is already stored in the waveform RAM 8*b* of the tone generator/effect circuit 8 (see step S2 of FIG. 4). When it is determined that the designated waveform data WV is not stored in the waveform RAM 8*b* because of absence of the waveform ID in the waveform management file WM (P3=NO), the CPU 1 proceeds to step P4. In step P4, the CPU 1 determines whether the designated voice file VFe is a voice file VFa of type 1 which does not contain the designated waveform data WV identified on the basis of the waveform ID specified by the waveform identification information DW (see step S3 of FIG. 4).

When it is determined in the file type determination step P4 that the designated voice file VFe is a voice file VFa of type 1 (P4=NO), the CPU 1 performs waveform data individual decryption processing for the encrypted waveform package file WFe included in the voice data set in steps P5 to P8. In the waveform data individual decryption processing, at step P5, the CPU 1 decrypts the encrypted address table ATe included in the encrypted waveform package file WFe by use of the decrypted first key (KF). From the decrypted address table AT, the CPU 1 then finds out, on the basis of the storage location information LC (HA, EA) corresponding to the waveform ID specified by the waveform identification information DW of the designated voice file VFe, the location at which the desired encrypted waveform data set WVe which has the waveform ID and is to be used is situated in the encrypted waveform package file WFe. The desired encrypted waveform data which is to be used is specified by the waveform ID.

In step P6, the CPU 1 extracts the desired encrypted waveform data set WVe from the waveform package file WFe on the basis of the found storage location. That is, the CPU 1 reads out the encrypted waveform data set WVe from the waveform package file WFe into the waveform data retention area of the RAM 2. In step P7, the CPU 1 decrypts the desired encrypted waveform data set WVe read into the RAM 2 by use of the first key (KF). In step P8, the CPU 1 loads the decrypted designated waveform data set WV into the electronic musical apparatus (electronic musical instrument) Em to store the designated waveform data set WV in the waveform RAM 8*b* of the tone generator/effect circuit 8.

When it is determined in the file type determination step P4 that the designated voice file VFe is a voice file VFb of type 2 (P4=YES), the CPU 1 proceeds to step P9 to load the designated waveform data set WV contained in the voice file VF which has been already obtained by the decryption process of the encrypted voice file VFe in step P2 into the electronic musical apparatus (electronic musical instrument) Em to store the designated waveform data set WV in the waveform RAM 8*b* of the tone generator/effect circuit 8.

When it is determined in step P3 that the designated waveform data set WV is already stored in the waveform RAM 8*b* (P3=YES), or after the loading of the designated waveform data set WV in step P8 or step P9, the CPU 1 proceeds to step P10 to load the tone color parameter data PR contained in the designated voice file VF into the electronic musical apparatus (electronic musical instrument) Em to store the tone color parameter data PR in the storage area 8*a* of the tone generator/effect circuit 8.

In step P11, it is determined whether there still remains an encrypted voice file VFe which is to be loaded. When it is determined that there is an encrypted voice file VFe which is to be loaded (P11=YES), the CPU 1 returns to step P1 to designate an encrypted voice file VFe which is situated in the next place as a voice file to be loaded, and repeat the above-described steps P1 to P10 as long as there remains an encrypted voice file VFe which is to be loaded. When it is determined that there is no encrypted voice file VFe which is to be loaded any more (P11=NO), the encrypted voice file loading processing (musical content data processing) completes, so that the electronic musical apparatus (electronic musical instrument) Em returns to the standby state.

In a case where a plurality of waveform data sets WV are identified in a voice file VF, the processes similar to those explained in the voice file loading processing (musical content file processing) of FIG. 4 are performed. That is, when it is determined in step P3 that at least one of the waveform data sets WVs is not stored in the RAM 8*b*, the CPU 1 proceeds to step P4 to execute steps P5 to P9 for waveform data WVe of the encrypted waveform package file WFe or waveform data WV of the decrypted voice file VF corresponding to the designated waveform data WV which is not stored. In a case where the voice files VF include a voice file VFc of type 3, the file type determination step P4 determines which one of the types 1 to 3 a target voice file is. As for the voice file VFc which is determined that the voice file is type 3, the CPU 1 executes processes similar to steps P5 to P9 for designated waveform data WV which is not stored in the waveform RAM 8*b*. More specifically, the designated waveform data WV which is not contained in the voice file VFc and is not stored in the RAM 8*b* is read from the encrypted waveform package file WF to be decrypted and stored in the waveform RAM 8*b* (P5 to P8), whereas designated waveform data WV which is contained in the voice file VFc and is not stored in the RAM 8*b* is read out from the decrypted voice file VFc and then stored in the waveform RAM 8*b* (P9).

As for the musical content data processing system according to the embodiment of the present invention, as described above, if attention is focused on the processing on encrypted waveform data WVe contained in an encrypted waveform package file WFe, it can be considered that the contents of the encrypted waveform package file WFe are musical contents whereas the contents of the encrypted waveform data WVe are musical content material data. Furthermore, the storage portion Cs stores the musical contents (waveform package file) WFe in which a plurality of musical content material data sets (waveform data sets) WVe: WVe1, WVe2, etc. each of which has identification information (waveform ID) and is encrypted are recorded (also referred to as "stored") and the storage location information (encrypted address table) ATe for identifying respective record locations (also referred to as "storage locations") LC in the musical contents (waveform package file) WFe on the basis of the correlation between the respective identification information (waveform IDs) given to the respective musical content material data sets (waveform data sets) WVe included in the musical contents (waveform package file) WFe and the respective record locations. For use of a desired musical content material data set (waveform data set) WVe contained in the musical contents (waveform package file) WFe on the electronic musical apparatus Em, the record location on the musical contents (waveform package file) WFe of the desired musical content material data set WVe having identification information (waveform ID) is identified in accordance with the record location information (encrypted address table) ATe on the basis of the identification information (waveform ID) of the desired musical content material data set WVe (P5). On the basis of the identified record location, the encrypted musical content material data set (waveform data set) WVe is extracted (P6). Then, the extracted desired musical content material data set (waveform data set) WVe is decrypted (P7). By such processes, the musical content data processing system according to the embodiment of the invention enables prompt decryption of only the desired encrypted musical content material data set (waveform data set) contained in the musical contents (waveform package file) having encrypted musical content material data sets (waveform data sets) to make the desired musical content material data set (waveform data set) available for use.

Various Embodiments

The embodiment of the present invention has been described with reference to the drawings. The embodiment is, however, a mere example. The present invention can be variously modified without departing from the spirit and scope of the invention. For example, the encrypted address table ATe may be included in the encrypted waveform package file WFe as indicated in the left of FIG. 5(2). Alternatively, the encrypted address table ATe may be provided separately from the waveform package file WFe.

As the musical content material data, the embodiment employs a plurality of waveform data sets (WV) which correspond to various tone color parameter data sets (PR) and are used selectively. As the musical content material data, however, any kind of data may be employed as long as plural sets of data of the same kind which correspond to various musical performances and are selectively used on an electronic musical apparatus are employed such as a plurality of audio data sets which correspond to various automatic performance data sets or automatic accompaniment style data sets and are selectively used, and a plurality of video data sets which correspond to various automatic performance data sets and are selectively used.

What is claimed is:

1. A musical content data processing apparatus comprising:

a receiving portion for receiving a musical content package file which includes musical contents in which a plurality of musical content material data sets each of which is given a piece of identification information and is encrypted are recorded, and encrypted location information for identifying respective locations at which the respective musical content material data sets are situated in the musical content package file, the respective locations of the musical content material data sets being correlated with the respective identification information pieces of the musical content material data sets;

a storing portion for storing the musical content package file received by the receiving portion;

a location identifying portion for decrypting the location information included in the musical content package file stored in the storing portion, and identifying, on the basis of the decrypted location information, a location which is correlated with an identification information piece given to a target musical content material data set which is to be used;

a musical content material extracting portion for extracting, on the basis of the location identified by the location identifying portion, the target musical content material data set which is to be used from the musical content package file stored in the storing portion; and a musical content material decrypting portion for decrypting the musical content material data set extracted by the musical content material extracting portion.

2. A musical content data processing apparatus according to claim 1, further comprising:

an encrypted first key storing portion for storing an encrypted first key obtained by encrypting a first key used for encryption of the musical content material data sets by use of apparatus unique information unique to the musical content data processing apparatus; and a first key decrypting portion for decrypting the encrypted first key stored in the encrypted first key storing portion by use of the apparatus unique information unique to the musical content data processing apparatus, wherein the musical content material decrypting portion decrypts the musical content material data set extracted by the musical content material extracting portion by use of the decrypted first key.

3. A musical content data processing apparatus according to claim 1, further comprising: an encrypted first key storing portion for storing an encrypted first key obtained by encrypting a first key used for encryption of the location information by use of apparatus unique information unique to the musical content data processing apparatus; and a first key decrypting portion for decrypting the encrypted first key stored in the encrypted first key storing portion by use of the apparatus unique information unique to the musical content data processing apparatus, wherein the location identifying portion decrypts the location information included in the musical content package file stored in the storing portion by use of the decrypted first key.

4. A non-transitory storage medium storing a program applied to a musical content data processing apparatus, the program comprising the steps of:

receiving a musical content package file which includes musical contents in which a plurality of musical content material data sets each of which is given a piece of identification information and is encrypted are recorded, and encrypted location information for identifying respective locations at which the respective musical content material data sets are situated in the musical content package file, the respective locations of the musical content material data sets being correlated with the respective identification information pieces of the musical content material data sets, the program being executed by a computer of the musical content data processing apparatus;

storing the musical content package file received by the receiving step;

decrypting the location information included in the musical content package file stored in the storing step;

identifying, on the basis of the decrypted location information, a location which is correlated with an identification information piece given to a target musical content material data set which is to be used;

extracting, on the basis of the location identified by the location identifying step, the target musical content material data set which is to be used from the musical content package file stored in the storing step; and decrypting the musical content material data set extracted by the musical content material extracting step.

5. A non-transitory storage medium according to claim 4, wherein the musical content data processing apparatus includes an encrypted first key storing portion for storing an encrypted first key obtained by encrypting a first key used for encryption of the musical content material data sets by use of apparatus unique information unique to the musical content data processing apparatus;

the program further comprises the step of decrypting the encrypted first key stored in the encrypted first key storing portion by use of the apparatus unique information unique to the musical content data processing apparatus; and the musical content material decrypting step decrypts the musical content material data set extracted by the musical content material extracting step by use of the decrypted first key.

6. A non-transitory storage medium according to claim 4, wherein the musical content data processing apparatus includes an encrypted first key storing portion for storing an encrypted first key obtained by encrypting a first key used for encryption of the location information by use of apparatus unique information unique to the musical content data processing apparatus;

the program further comprises the step of decrypting the encrypted first key stored in the encrypted first key storing portion by use of the apparatus unique information unique to the musical content data processing apparatus; and the location identifying step decrypts the location information included in the musical content package file stored in the storing step by use of the decrypted first key.

7. A musical content data processing apparatus according to claim 1, wherein the storing portion stores further a plurality of second musical content data sets which are associated with the plurality of musical content material data sets, the second musical content data set including the identification information pieces of the musical content material data sets; and the location identifying portion identifies the location by using the identification information pieces included in the second musical content data set and the decrypted location information.

8. A non-transitory storage medium according to claim 4, wherein the storing step stores further a plurality of second musical content data sets which are associated with the plurality of musical content material data sets, the second musical content data set including the identification information pieces of the musical content material data sets; and the location identifying step identifies the location by using the identification information pieces included in the second musical content data set and the decrypted location information.

9. A musical content data processing apparatus according to claim 1, wherein the musical content package file further includes an encrypted first key obtained by encrypting a first key used for encryption of the musical content material data sets by use of apparatus unique information unique to the musical content data processing apparatus.

10. A non-transitory storage medium according to claim 4, wherein the musical content package file further includes an encrypted first key obtained by encrypting a first key used for encryption of the musical content material data sets by use of apparatus unique information unique to the musical content data processing apparatus.

* * * * *